(12) United States Patent
Allen-Ware et al.

(10) Patent No.: US 9,323,301 B2
(45) Date of Patent: *Apr. 26, 2016

(54) COMPUTING SYSTEM VOLTAGE CONTROL

(71) Applicant: International Business Machines Corporation, Armonk, NY (US)

(72) Inventors: Malcolm S. Allen-Ware, Austin, TX (US); Bishop Brock, Coupland, TX (US); Tilman Gloekler, Gaertringen (DE); Timothy G. Hallett, Oronoco, MN (US); Charles R. Lefurgy, Austin, TX (US); Karthick Rajamani, Austin, TX (US); Guillermo J. Silva, Austin, TX (US); Gregory S. Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 388 days.

This patent is subject to a terminal disclaimer.

(21) Appl. No.: 13/773,841

(22) Filed: Feb. 22, 2013

(65) Prior Publication Data

US 2014/0149763 A1      May 29, 2014

Related U.S. Application Data

(63) Continuation of application No. 13/686,367, filed on Nov. 27, 2012.

(51) Int. Cl.
*G06F 1/32* (2006.01)
*G06F 1/26* (2006.01)

(52) U.S. Cl.
CPC .............. *G06F 1/26* (2013.01); *G06F 1/3296* (2013.01); *Y02B 60/1285* (2013.01)

(58) Field of Classification Search
CPC ...................................... G06F 1/3296
See application file for complete search history.

(56) References Cited

U.S. PATENT DOCUMENTS 5,086,501 A * 2/1992 DeLuca et al. ................. 713/300
5,727,193 A * 3/1998 Takeuchi ....................... 713/501

(Continued)

OTHER PUBLICATIONS

"System level analysis of fast, per-core DVFS using on-chip switching regulators" Wonyoung Kim; Gupta, Meeta S.; Gu-Yeon Wei; Brooks, David. 2008 IEEE 14th International Symposium on High Performance Computer Architecture: 123-34. IEEE. (2008).*

(Continued)

*Primary Examiner* — Jaweed A Abbaszadeh
*Assistant Examiner* — Gary Collins
(74) *Attorney, Agent, or Firm* — DeLizio Law, PLLC

(57) ABSTRACT

Computing system voltage control methods include receiving an indication of a first performance state. The first performance state is associated with a first voltage and applies to at least one computing system component. The indication of the first performance state is received by a first computing system component from a second computing system component. An indication of a second performance state is received, wherein the second performance state is associated with a second voltage that is not equal to the first voltage. It is determined whether the second performance state is within a range defined by a minimum performance state and a maximum performance state. Responsive to determining that the second performance state is within the range defined by the minimum performance state and the maximum performance state, the voltage of the at least one computing system component is set equal to the voltage associated with the second performance state.

6 Claims, 7 Drawing Sheets

(56) References Cited

U.S. PATENT DOCUMENTS

| | | |
|---|---|---|
| 6,272,642 B2 | 8/2001 | Pole, II et al. |
| 6,311,287 B1* | 10/2001 | Dischler et al. ............... 713/601 |
| 6,535,798 B1* | 3/2003 | Bhatia et al. ................. 700/293 |
| 6,845,456 B1* | 1/2005 | Menezes et al. ............. 713/320 |
| 6,941,480 B1 | 9/2005 | Dai |
| 7,849,332 B1* | 12/2010 | Alben et al. ................. 713/300 |
| 7,921,312 B1* | 4/2011 | Pennanen et al. ............ 713/300 |
| 2001/0003206 A1* | 6/2001 | Pole et al. .................... 713/320 |
| 2002/0087897 A1* | 7/2002 | Cline et al. ................... 713/300 |
| 2003/0093160 A1* | 5/2003 | Maksimovic et al. .......... 700/14 |
| 2003/0120961 A1* | 6/2003 | Cooper ......................... 713/320 |
| 2004/0003301 A1* | 1/2004 | Nguyen ........................ 713/300 |
| 2004/0025069 A1* | 2/2004 | Gary et al. .................... 713/300 |
| 2004/0059545 A1* | 3/2004 | Sun ............................... 702/186 |
| 2005/0262365 A1* | 11/2005 | Lint et al. ..................... 713/300 |
| 2007/0008011 A1* | 1/2007 | Thurston ......................... 326/93 |
| 2007/0033425 A1* | 2/2007 | Clark ............................ 713/320 |
| 2007/0300088 A1* | 12/2007 | Lippojoki ..................... 713/320 |
| 2008/0040622 A1* | 2/2008 | Duran et al. ................. 713/300 |
| 2008/0235364 A1* | 9/2008 | Gorbatov et al. ............. 709/224 |
| 2008/0244294 A1* | 10/2008 | Allarey ......................... 713/324 |
| 2009/0198979 A1* | 8/2009 | Verdun ......................... 712/229 |
| 2009/0307509 A1* | 12/2009 | Jenne ............................ 713/322 |
| 2009/0327764 A1* | 12/2009 | Brey et al. .................... 713/300 |
| 2010/0162023 A1* | 6/2010 | Rotem et al. ................. 713/340 |
| 2010/0191936 A1* | 7/2010 | Khatri et al. ................... 712/42 |
| 2010/0268968 A1* | 10/2010 | Ghiasi et al. ................. 713/300 |
| 2011/0314312 A1* | 12/2011 | Naffziger et al. ............. 713/323 |
| 2013/0145188 A1* | 6/2013 | Gloekler et al. ............. 713/322 |
| 2014/0006818 A1* | 1/2014 | Doshi et al. .................. 713/320 |
| 2014/0229750 A1* | 8/2014 | Bhandaru et al. ............. 713/320 |

OTHER PUBLICATIONS

Ioannou, Nikolas et al., "Phase-Based Application-Driven Hierarchical Power Management on the Single-chip Cloud Computer", IEEE publication {nikolas.ioannou@lmc@staffmail}.ed.ac.uk {michael. kauschke|matthias.gries} @intel.com 2011, pp. 131-142.

"U.S. Appl. No. 13/686,367 Office Action", Mar. 3, 2015, 15 Pages.

* cited by examiner

COMPUTING SYSTEM VOLTAGE CONTROL

RELATED APPLICATIONS

This application claims the priority benefit of U.S. application Ser. No. 13/686,367 filed Nov. 27, 2012.

BACKGROUND

Embodiments of the inventive subject matter generally relate to the field of computers, and, more particularly, to computing system power management.

As the demand for increased computer performance grows, the demand for lower power consumption grows with it. These two goals share a fairly antagonistic relationship, in that decreasing power consumption while increasing or maintaining performance can be difficult. Techniques to reduce power consumption have been developed, but system designers are constantly searching for new ways to reduce power consumption. Although not necessarily obvious to individual users, owners of data centers are fully aware that the electricity costs associated with data centers are one of the largest overhead costs. Furthermore, as power management has advanced, power management complexity has also increased. Some computing systems are designed to include a microprocessor dedicated to power management. Even in simple power management implementations, the amount of information and monitoring to achieve good power savings is large.

SUMMARY

Embodiments of the inventive subject matter include methods for computing system voltage control. In some embodiments, an indication of a performance state is received. The first performance state is associated with a first voltage. The first performance state applies to at least one computing component, and the indication of the first performance state is received by a first computing system component from a second computing system component that is distinct from the first computing system component. An indication of a second performance state is received. The second performance state is associated with a second voltage that is not equal to the first voltage. It is determined whether the second performance state is within a range defined by a minimum performance state and a maximum performance state. Responsive to determining that the second performance state is within the range defined by the minimum performance state and the maximum performance state, the voltage of the at least one computing system is set equal to the voltage associated with the second performance state.

Alternative embodiments of the inventive subject matter include a second method. It is determined whether a first request to modify a voltage of a first computing system component is within a specified range. The first request to modify the voltage of the computing system component is received by a second computing system component from a third computing system component. Responsive to determining that the first request to modify the voltage of the first computing system component is within the specified range, the voltage of the first computing system component is set to a voltage associated with the first request. Responsive to determining that the first request to modify the voltage of the first computing system component is not within the specified range, the voltage of the computing system is set to one of a voltage associated with the second request to modify the voltage of the first computing system component, a maximum voltage of the specified range and a minimum voltage of the specified range.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
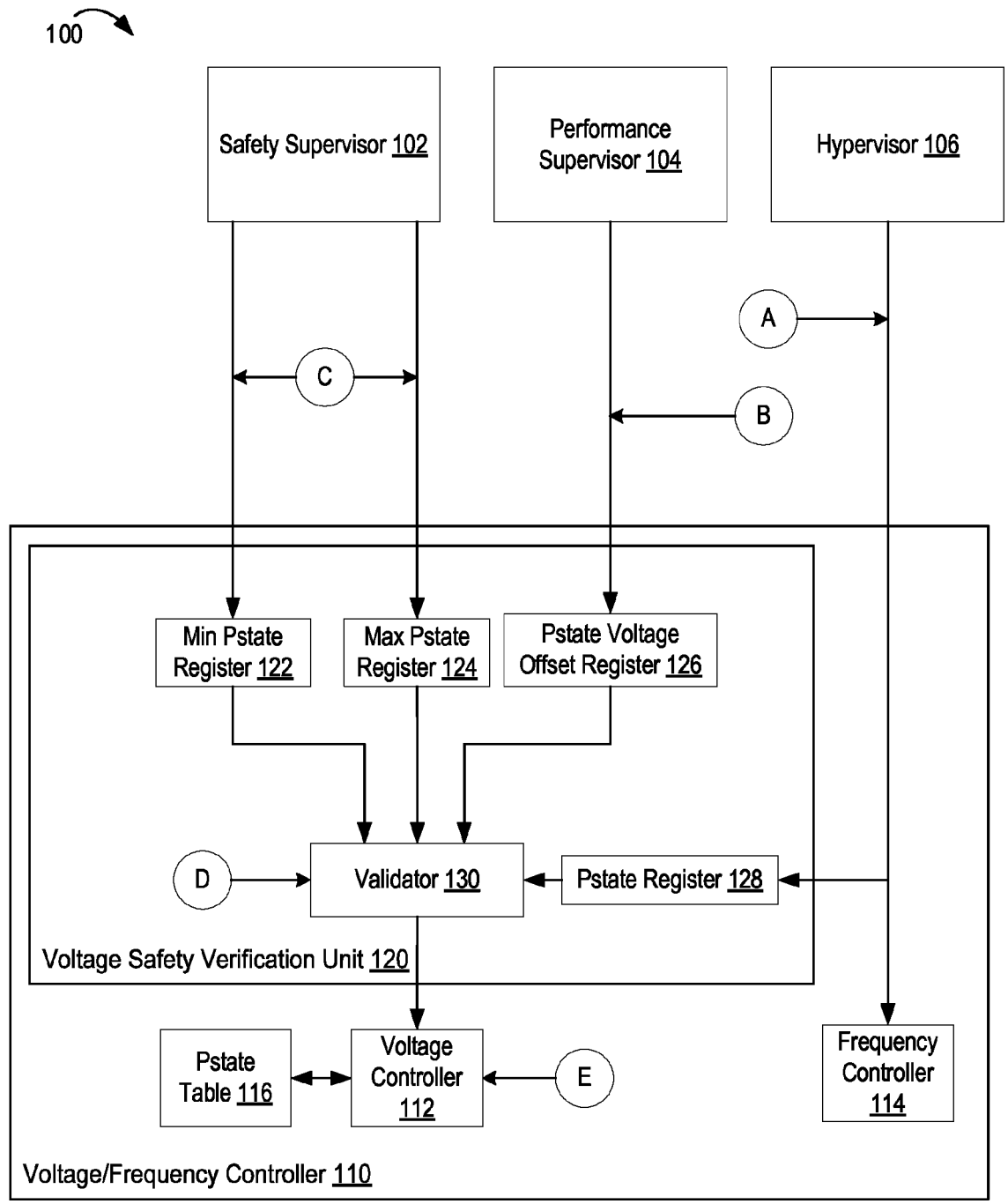
FIG. 1 depicts interactions between components of a computing system that utilizes a voltage safety verification unit.

The description that follows includes example systems, methods, techniques, instruction sequences and computer program products that embody techniques of the present inventive subject matter. However, it is understood that the described embodiments may be practiced without these specific details. For instance, although examples refer to hardware implementations, much of the functionality can be embodied in software or a combination of software and hardware. Additionally, although reference is made to using the techniques discussed herein to reduce the power of a processor in a computing system, the inventive subject matter applies to devices in computing systems and other similar situations. In other instances, well-known instruction instances, protocols, structures and techniques have not been shown in detail in order not to obfuscate the description.

The reduction of a computing system's power consumption can be accomplished by reducing the operating frequency or voltage of the processor, among other ways. One goal of computing system designers is to reduce power consumption while minimizing the impact on performance. An example of a technique used to accomplish this is lowering the operating frequency and voltage of the processor while the system is under light load or idle. Although this may reduce the performance of the computing system, because the computing system is under a light load, it is less noticeable to the user. Another example is that of having multiple levels of "sleep" states. One sleep state may reduce the power consumption of a computing system over a second sleep state, but may take longer to "wake up." Although it may take longer to wake up from the first sleep state, the first sleep state would be used less frequently, thus making the performance similar to that of the second sleep state when aggregated together.

Some computing systems implement the advanced configuration and power interface (hereinafter ACPI). ACPI defines multiple sets of states that represent various power and performance modes. For example, the ACPI defines a set of processor states C0-C3 (commonly referred to as Cstates). Processor state C0 corresponds to a processor in an operating state, whereas processor states C1-C3 correspond to various non-operating states, such as a "halted" or "sleep" state. Typically, the further away from C0, the lower the power consumption.

The ACPI also defines a set of performance states P0-Pn (commonly referred to as Pstates). In general, the higher the performance state, the lower the processor frequency and processor voltage, and thus, the lower the performance of the computing system. Although each performance state corresponds to a certain frequency, the specific frequencies for a given state are implementation specific. For example, performance state P0 can correspond to the maximum processor frequency. Thus, performance state P0 for a 2.5 gigahertz processor corresponds to 2.5 gigahertz, whereas performance state P0 for a three gigahertz processor corresponds to three gigahertz. The scaling of frequency and voltage between performance states can also differ between implementations, even if the maximum processor frequency is the same. For example, assume two computing systems have the same maximum processor frequency and define the same number of performance states. A performance state change in one implementation can correspond to a frequency change of one hundred megahertz, while a performance state change in the other implementation can correspond to a frequency change of two hundred megahertz. In other words, the ACPI defines the interface, but the actual implementation defines the number of performance states and the frequency and voltage settings associated with the different states.

Computing systems can be implemented to allow various components to request changes to the machine state. For example, hardware can change the processor state from C0 to C3 in response to a laptop being closed, or a power management component can change the performance state from P0 to P10 when the computing system is under a light load. The computing system can also be designed to allow software to request changes to the performance state. For example, an operating system, hypervisor, or even individual application can request a performance state change.

The voltages associated with specific frequencies and performance states are not arbitrary. Transistors, the building blocks of a processor, turn "on" and "off" in response to an electrical signal being applied to specific terminals of the transistor. The rate at which a transistor turns on or off varies with the amount of voltage applied. The lower the voltage, the longer it takes for the transistor to switch states. The higher the voltage, the quicker the transistor switches states. Thus, a particular processor frequency will have a corresponding minimum voltage. In other words, given a processor operating at a particular frequency, the processor voltage can be lowered to a minimum voltage. As the voltage drops below the minimum voltage, the transistors cannot switch states quick enough, causing problems.

The minimum voltage for a given frequency can vary between implementations and operating conditions. Having a single voltage associated with a specific frequency is inefficient because the voltage may be higher than the minimum voltage for the given frequency, resulting in unnecessary power consumption. Thus, being able to adjust the processor voltage independently of the frequency allows for added energy savings. Additionally, independent adjustment of the processor voltage allows the voltage to be increased to support a particular frequency requested by the operating system of a system. For example, an operating system may request a particular performance state, which corresponds to 2.5 gigahertz and 0.8 volts. If the processor operating conditions are such that 0.8 volt is too low to support 2.5 gigahertz, without the ability to independently adjust the processor voltage, the processor would not be able to satisfy the request.

Furthermore, without the ability to independently control the voltage, the computing system component requesting changes to the performance state is tightly coupled to, or the same as the component that manages the voltage level. For example, in an implementation where the operating system requests the performance state changes, the component that controls the voltages communicates whether a performance state change is allowed or denied, or what the lowest performance state may be at a given time. If the operating system adjusts the performance state frequently in response to the software running on the computing system, the communications between the two components can add overhead, reducing the overall system performance. In a cloud computing or similar scenario, a single computing system can include a hypervisor managing multiple virtual machines, all running on multiple cores. The hypervisor can manage the performance state of each virtual machine, submitting performance state change requests to each core. Reducing the overhead created by decoupling the performance state change requester, like a hypervisor, and the processor voltage control component can improve the overall system performance.

Thus, a computing system can be designed to decouple the performance state change requester from the processor voltage control component, allowing the processor voltage to be regulated independently. The independent processor voltage control can allow the voltage to be decreased beyond the voltage associated with a particular performance state, reducing power consumption. The independent processor voltage control can also allow the voltage to be increased beyond the voltage associated with a particular performance state, allowing the computing system to maintain processor performance under a larger number of operating conditions. System overhead can be further reduced while allowing for greater flexibility in selecting components to manage the performance state of the processor. Thus, the independent processor voltage control can allow for greater operational safety and greater performance with lower power consumption.

FIG. 1 depicts the interactions between components of a computing system that utilizes a voltage safety verification unit. FIG. 1 depicts a computing system 100, including a safety supervisor 102, a performance supervisor 104, a hypervisor 106, and a voltage/frequency controller (hereinafter V/F controller) 110. The V/F controller 110 includes a voltage controller 112, a frequency controller 114, a performance state table 116 and a voltage safety verification unit (hereinafter verification unit) 120. The verification unit 120 includes a minimum performance state register 122, a maximum performance state register 124, a performance state voltage offset register 126, a performance state register 128, and a validator 130.

At stage A, the hypervisor 106 sends an indication of a requested performance state to the V/F controller 110. The requested performance state is saved in the performance state register 128 and in the frequency controller 114. In some implementations, the frequency controller 114 reads the requested performance state from the performance state register 128. The hypervisor 106 acts as the performance manager for its associated virtual machines. The hypervisor 106 can request changes to the performance state for various reasons. For example, a virtual machine managed by the hypervisor 106 can go idle, the computing system can have a cap on the amount of power it is permitted to use, or the operating conditions can otherwise be such that the performance state should be adjusted.

At stage B, the performance supervisor 104 writes an offset value to the performance state voltage offset register 126. The offset value specifies which performance state corresponds to the voltage to use relative to the requested performance state. For example, if the performance state is P5, an offset value of two specifies that the processor voltage should be set to that of performance state P7. If the performance state is P5 and the offset value is negative two, the processor voltage should be set to that of performance state P3.

At stage C, the safety supervisor 102 sets the minimum performance state register 122 and maximum performance state register 124. The minimum performance state register 122 specifies the performance state corresponding to the lowest voltage level allowed. The maximum performance state register 124 specifies the performance state corresponding to the highest voltage level allowed. For example, the current processor operating conditions may dictate that the lowest voltage allowable for the current frequency is 0.8 V. If 0.8 V corresponded to performance state P5, the safety supervisor 102 would set the minimum performance state register 122 to indicate performance state P5.

At stage D, the validator 130 reads each register value and determines what performance state value to send to the voltage controller 112. The validator 130 attempts to minimize or maximize the processor voltage without going outside of the range specified by the safety supervisor 102. The target performance state is the requested performance state with the performance state voltage offset value applied to it. The application of the offset value to the requested performance state can vary between implementations. In some implementations, applying the performance state voltage offset value will entail subtracting the offset value to the requested performance state. In some implementations, applying the performance state voltage offset value will entail adding the offset value to the requested performance state. If the target performance state falls within the range indicated by the values in the minimum performance state register 122 and maximum performance state register 124, the target performance state is sent to the voltage controller 112. If the target performance state does not fall into the specified range, the validator 130 determines the minimum performance state possible, as detailed below. Once the validator 130 has determined the minimum performance state possible, the performance state is sent to the voltage controller 112.

At stage E, the voltage controller 112 receives the performance state from the validator 130. The voltage controller 112 determines the appropriate voltage by looking up the performance state in the performance state table 116. The performance state table 116 specifies the frequency and voltage corresponding to each performance state. Different processor or system components may operate at different voltages, thus each performance state may have a set of voltages associated with it in the performance state table 116. After determining the appropriate voltage(s), the voltage controller 112 sets the processor voltage in accordance with the specified performance state.

The performance state register 128 is depicted as residing within the voltage safety verification unit 120. The inventive subject matter is not so limited. The performance state register 128 can exist in various places, including elsewhere on a processor or on a separate device, such as a power management microprocessor. Additionally, there may be multiple registers that store the requested performance state like the performance state register 128. Other components depicted or described herein can be embodied as part of other components as well.

The safety supervisor 102 and performance supervisor 104 are depicted as being individual, independent entities. The inventive subject matter is not so limited. The safety supervisor 102 and performance supervisor 104 can be part of a single power management unit, which can be embodied in hardware, software, or combination thereof. Additionally, the safety supervisor 102 and performance supervisor 104 can be envisioned as one entity, such as a single supervisor. They are depicted herein as separated by functionality to assist in clarifying the inventive subject matter.

Although the voltage safety verification unit 120 is depicted as existing in hardware, the inventive subject matter is not so limited. The functionality embodied in the voltage safety verification unit 120 can be embodied in software as well, or a combination of software and hardware. If embodied in software, the software can exist in any location capable of running the software that has access to the related components. For example, software embodying the functionality of the voltage safety verification unit 120 can be part of the power management software running on a microprocessor dedicated to power management. If embodied in hardware, the registers depicted can be any form of storage accessible to the relevant components. For example, instead of registers, shared memory locations accessible to the relevant components can be used.

Additionally the performance state table 116 is depicted as part of the voltage/frequency controller 110. As discussed above, the various components depicted, such as the performance state table 116, can exist in a variety of locations. Additionally, the implementation of the component interactions with the performance state table 116 may vary. The voltage controller 112 is depicted as looking up a performance state in the performance state table 116 to determine the proper voltage. The performance state table 116 could be implemented such that the validator 130 sends the performance state to the performance state table 116, with the performance state table 116 then writing the appropriate voltage to a register in the voltage controller 112.

Each stage described above can be independent of each other. For example, the hypervisor 106 can write to the performance state register many times over a particular interval, while the performance supervisor 104 or safety supervisor 102 only update the corresponding registers a few times, if at all. Furthermore, the validator 130 may validate the voltage performance state each time any register is updated. Thus, the computing system can be in stages A, B, C, and D at any time. Additionally, the ordering of stages A, B, C and D may vary.

Figure 2:
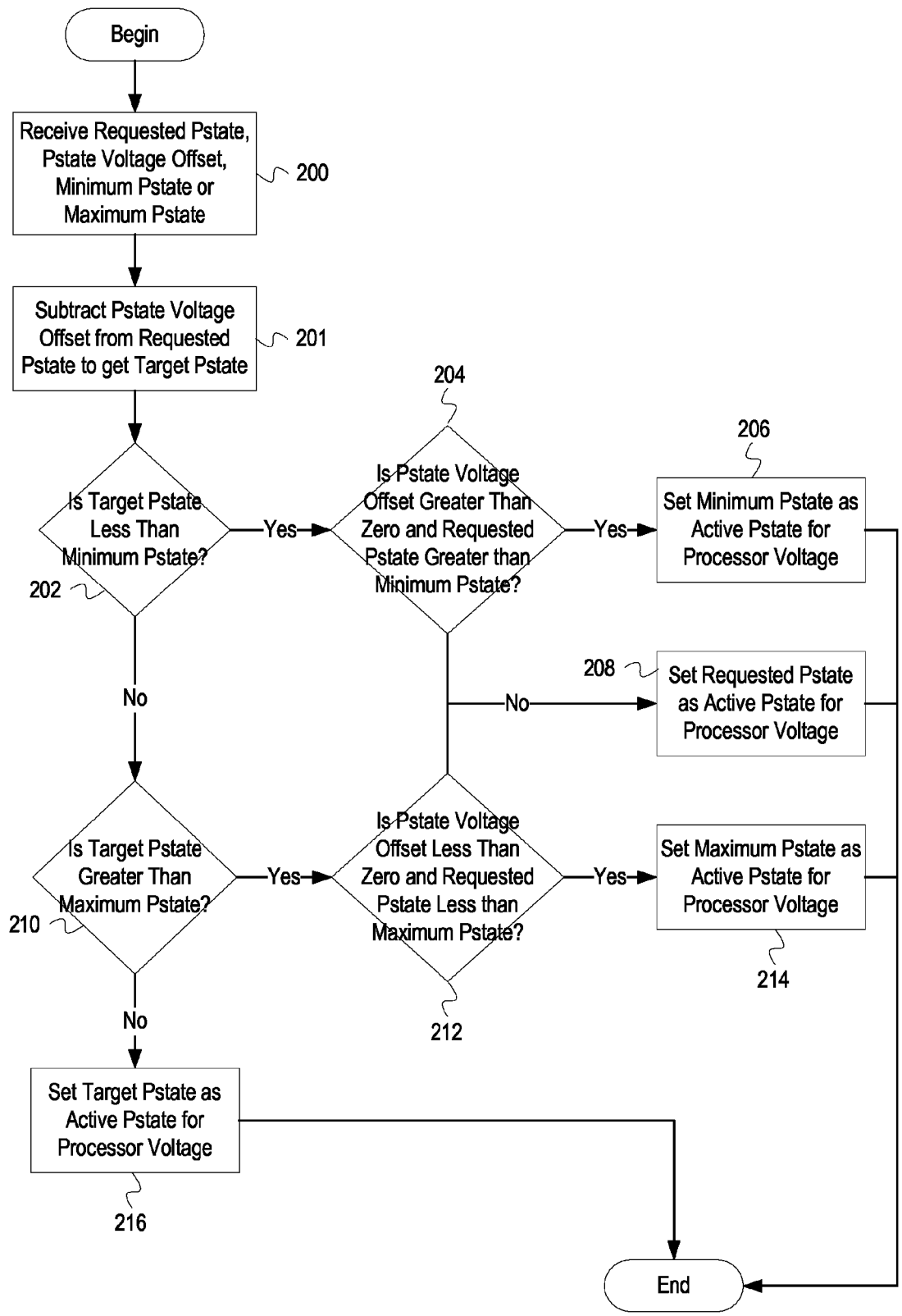
FIG. 2 depicts a flowchart of example operations to determine the minimum performance state for a processor voltage controller.

FIG. 2 depicts a flowchart of example operations to determine the minimum performance state for a processor voltage controller. Control is discussed in reference to a voltage safety verification unit 120 (FIG. 1).

At block 200, a requested performance state, performance state voltage offset, minimum performance state or maximum performance state are received. The requested performance state can come from various sources, including an operating system, a hypervisor, or even individual applications. The performance state voltage offset can come from a performance supervisor. The minimum and maximum performance states can come from a safety supervisor. The performance supervisor and safety supervisor can be components of or implemented as a performance management component. After the requested performance state, performance state voltage offset, minimum performance state or maximum performance state have been received, control then flows to block 201.

At block 201, the performance state voltage offset value is subtracted from the requested performance state to get the target performance state. The performance states can be implemented as integer values, such that P0 is represented by 0, P1 is represented by 1, and so on. The performance state voltage offset value and requested performance state are stored in registers. The values are read from the register, and the performance state voltage offset value is subtracted from the integer representation of the requested performance state. The resulting target performance state can be stored in a register to be used later. After determining the target performance state, control then flows to block 202.

At block 202, it is determined whether the target performance state is less than the minimum performance state. The safety supervisor determines the minimum performance state and writes it to a register. The voltage corresponding to the minimum performance state is the lowest voltage that the processor can safely run at. Thus, if the target performance state is less than the minimum performance state, the target performance state represents a voltage level that would be unsafe. The minimum performance state is read from the appropriate register, and compared to the target performance state. If it is determined that the target performance state is less than the minimum performance state, control then flows to block 204. If it is determined that the target performance state is greater than or equal to the minimum performance state, control then flows to block 210.

At block 204, it is determined whether the performance state voltage offset is greater than zero and the requested performance state is greater than the minimum performance state. The performance state voltage offset is read from the appropriate register and compared to zero. The requested performance state and minimum performance state are read from the appropriate registers and compared with each other. If it is determined that the performance state voltage offset is greater than zero and the requested performance state is greater than the minimum performance state, control then flows to block 206. If it is determined that the performance state voltage offset is less than or equal to zero or the requested performance state is less than or equal to the minimum performance state, control then flows to block 208.

At block 206, the active performance state corresponding to the processor voltage is set to the minimum performance state. Setting the active performance state to the minimum performance state sets the processor voltage to the minimum safe value, minimizing power consumption. This is done only after verifying that the performance state voltage offset is greater than zero, indicating that the performance supervisor is attempting to lower the processor voltage. Thus, even though the processor voltage cannot be set as low as the performance supervisor requests, the processor voltage is set to be as low as possible while maintaining safe operating conditions. The active performance state can be set in a variety of ways as dictated by the specific implementation. For example, the active performance state may be set by writing it to a register or sending it to a voltage controller. Additionally, a table lookup in a performance state table for the voltage(s) associated with the performance state can be performed. The associated voltages would then be sent to the voltage controller. After setting the active performance state to the minimum performance state, the process ends.

Control flowed to block 210 from block 202 after determining that the target performance state was greater than or equal to the minimum performance state. At block 210, it is determined whether the target performance state is greater than the performance state maximum. The performance state maximum is set by the safety supervisor and represents the highest voltage the processor can run at in terms of the processor state. Thus, if the target performance state is greater than the performance state maximum, the target performance state represents a voltage that would be unsafe. The performance state maximum is read from the appropriate register and compared to the target performance state. If the target performance state is greater than the performance state maximum, control then flows to block 212. If the target performance state is less than or equal to the performance state maximum, control then flows to block 216.

At block 212, it is determined whether the performance state voltage offset is less than zero and the requested performance state is less than the performance state maximum. The performance state voltage offset is read from the appropriate register and compared with zero. The requested performance state and performance state maximum are read from the appropriate registers and compared. If it is determined that the performance state voltage offset is less than zero and the requested performance state is less than the performance state maximum, control then flows to block 214. If it is determined that the performance state voltage offset is greater than or equal to zero or the requested performance state is greater than the performance state maximum, control then flows to block 208.

At block 214, the active performance state corresponding to the processor voltage is set to the performance state maximum. Setting the active performance state to the performance state maximum sets the processor voltage to the maximum safe value. This is done only after verifying that the performance state voltage offset is less than zero, indicating that the performance supervisor is attempting to increase the processor voltage. Thus, even though the processor voltage cannot be set as high as the performance supervisor requests, the processor voltage is set to be as high as possible while maintaining safe operating conditions. The active performance state can be set as described above. After setting the active performance state to the performance state maximum, the process ends.

Control flowed to block 208 if it was determined at block 204 that the performance state voltage offset was equal to or less than zero or the requested performance state was equal to or less than the minimum performance state. Control also flowed to block 208 if it was determined at block 212 that the performance state voltage offset was equal to or greater than zero or the requested performance state was equal to or greater than the performance state maximum. At block 208, the active performance state corresponding to the processor voltage is set to the requested performance state. After setting the active performance state to the requested performance state, the process ends.

Control flowed to block 216 if it was determined that the target performance state was less than or equal to the performance state maximum at block 210. At block 216, the active performance state corresponding to the processor voltage is set to the target performance state. At blocks 202 and 210 it was determined that the target performance state was not outside the bounds set by the safety supervisor. Thus, the target performance state is within the range of safe performance states and can be used as the active performance state. After setting the active performance state to the target performance state, the process ends.

In some embodiments, the voltage for each processor core can be controlled independently. In such embodiments, the method described above can be performed by each processor core. Because workloads and operating conditions can vary across cores, setting the processor voltage to a level high enough to satisfy all cores may cause increased power consumption if one or more cores can run at a lower voltage. Thus, being able to reduce voltage on a per-core basis allows for added energy savings.

Figure 3:
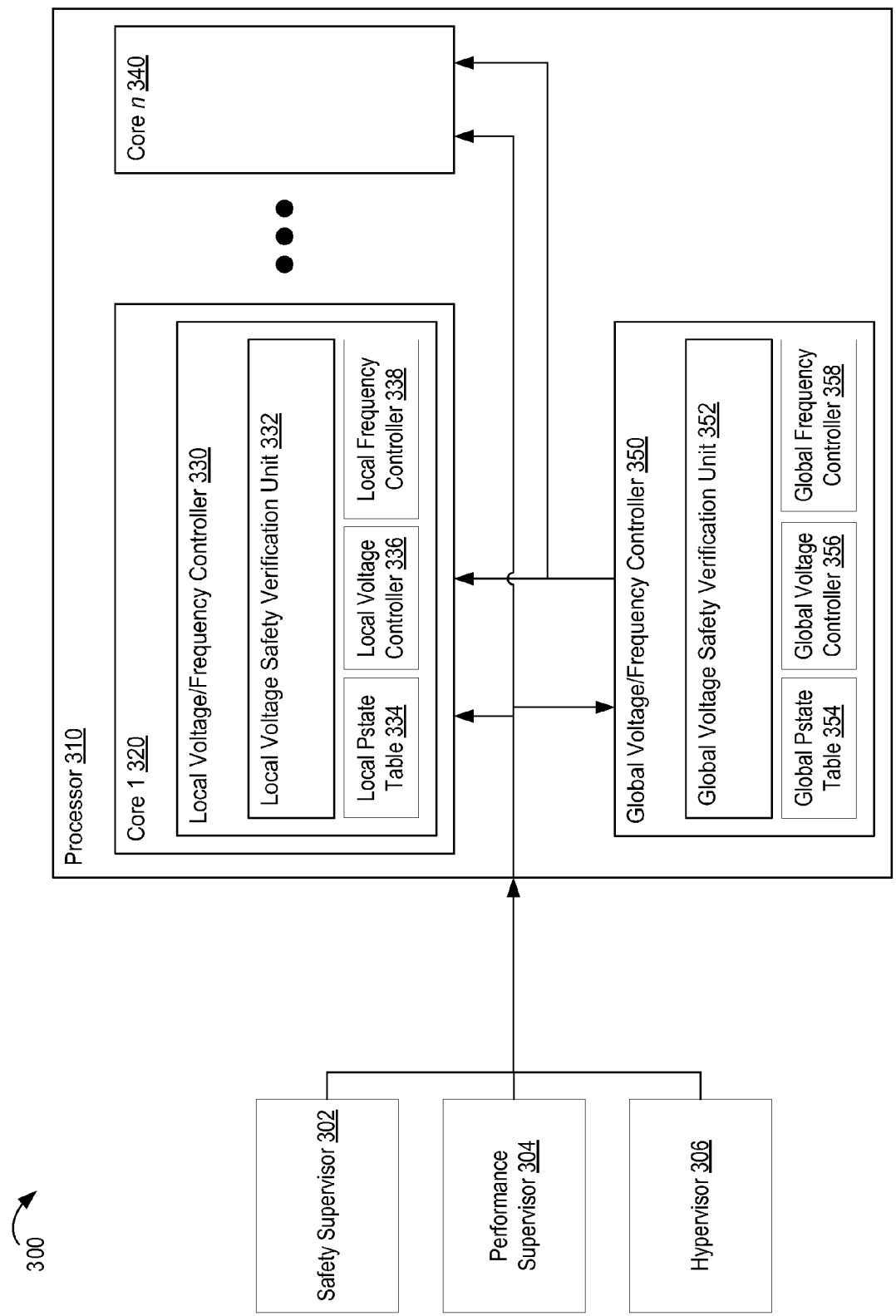
FIG. 3 depicts a high level overview of a computing system with a multicore processor with independent core voltage control.

FIG. 3 depicts a high level overview of a computing system with a multicore processor and independent core voltage control. FIG. 3 depicts a computing system 300, including a safety supervisor 302, a performance supervisor 304, a hypervisor 306 and a processor 310. The processor 310 includes cores 1 320 through n 340 and a global voltage/frequency controller (hereinafter global V/F controller) 350. Each core includes a local voltage/frequency controller (hereinafter local V/F controller) 330. Each local V/F controller 330 includes a local voltage safety verification unit (hereinafter local verification unit) 332, a local performance state table 334, a local voltage controller 336 and a local frequency controller 338. Although only depicted in the first core 320, all cores include a local V/F controller. The global V/F controller 350 includes a global voltage safety verification unit (hereinafter global verification unit) 352, a global performance state table 354, a global voltage controller 356 and a global frequency controller 358.

The safety supervisor 302, performance supervisor 304 and hypervisor 306 are individually coupled to each core and the global V/F controller 350. The safety supervisor 302 sets the minimum and maximum performance states for each core independently and the performance supervisor 304 sets the performance state voltage offset for each core independently. The hypervisor 306 can run on any number of the cores and request performance state changes for any of the cores. Additionally, the global V/F controller 350 is coupled with the local V/F controller 330. This allows the global V/F controller 350 to share data and settings with the local V/F controller 330. There may be scenarios in which the local performance state changes are not allowed. By coupling the global V/F controller 350 with the local V/F controller 330, the global V/F controller 350 can set the voltage of the local voltage controller 336 in scenarios where local performance state changes are not enabled.

The global performance state as used for voltage control is set based on the highest performance state requested of each core. This allows the global V/F controller 350 to supply enough voltage for the core with the greatest demand, but permits individual cores to run at a lower voltage if appropriate. The local V/F controller 330 also uses the global V/F controller 350 values, such as the minimum performance state and maximum, to determine whether local voltage control should be used. For example, if the local target performance state in the first core 320 corresponds to a voltage greater than the processor voltage as set by the global V/F controller 350, the local V/F controller cannot increase the voltage to the level of the local target performance state.

The safety supervisor 302, performance supervisor 304 and hypervisor 306 are depicted as existing outside of the processor 310. As described above, the safety supervisor 302 and performance supervisor 304 can be embodied in software. Additionally, the hypervisor 306 can be embodied in software. Thus, the safety supervisor 302, performance supervisor 304 and hypervisor 306 can be running on the processor 310 and one or more of the processor cores. Furthermore, each can be embodied as running on another processor separate from the main computing system 300 processor 310.

It is stated that the global performance state is set to the same performance state as the core with the highest performance state. The global performance state can be set to an even higher performance state, and is thus not limited to the highest core (local) performance state. The power management component of the computing system may, for example, determine that setting the global performance state to a higher performance state will increase overall performance of the system. Additionally, some implementations can be designed such that the individual cores can increase the voltage independently of the global performance state, allowing the global performance state to be lower than the highest core performance state.

Figure 4:
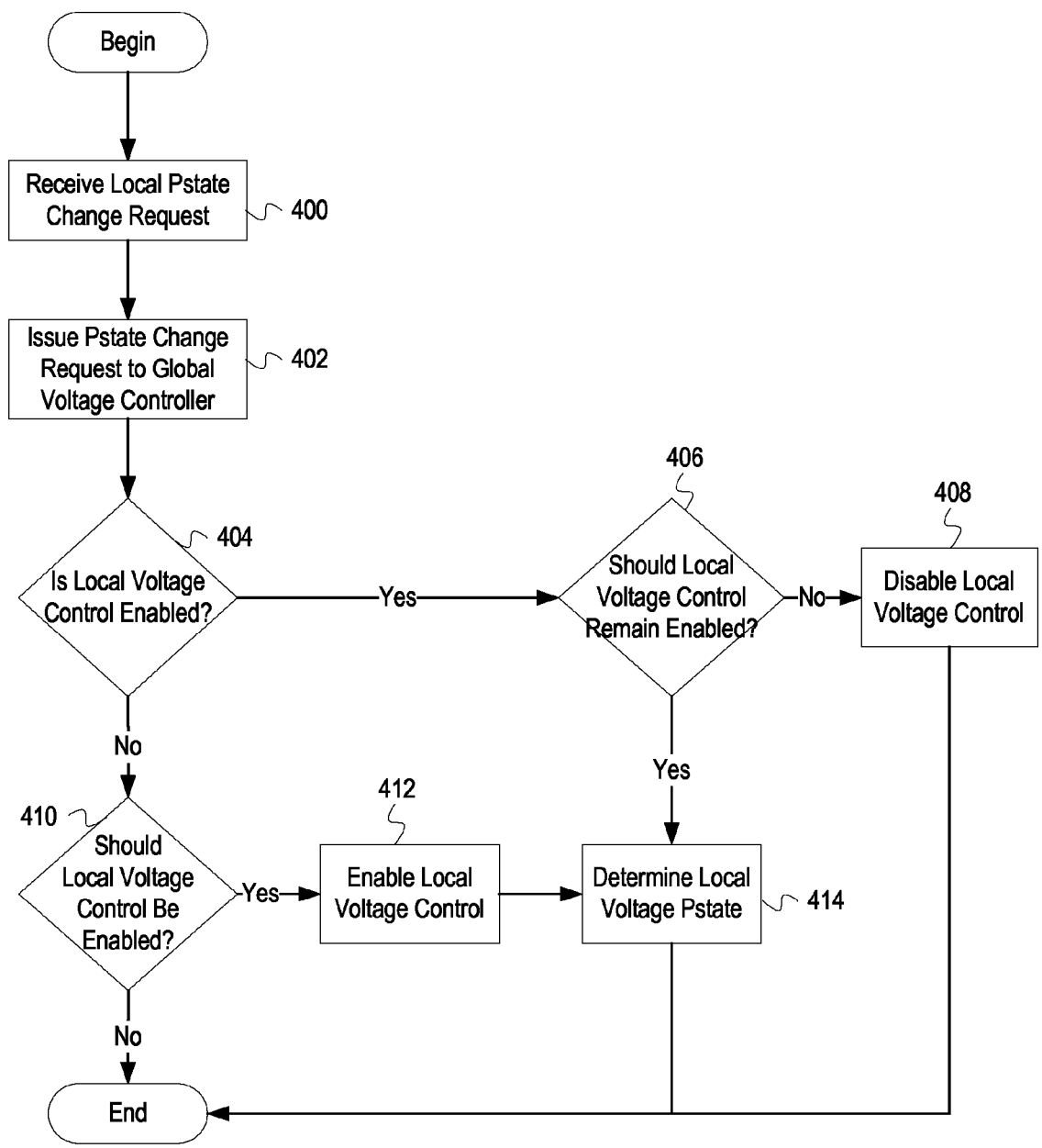
FIG. 4 depicts a flowchart of example operations for managing a core voltage controller.

FIG. 4 depicts a flowchart of example operations for managing a core voltage controller. Control is discussed in reference to a local voltage safety verification unit 332 (FIG. 3).

At block 400, a local performance state change request is received. Similar to a global performance state change request as discussed above, the local performance state change request can come from the computing system power management component, the operating system, hypervisor, etc. For example, if a virtual machine running on a particular processor core goes idle, the hypervisor may request a lower performance state for that core. After receiving the local performance state change request, control then flows to block 402.

At block 402, a global performance state change is requested. To request a global performance state change, the local performance state is sent to the global V/F controller. This can be implemented by storing the local performance state in a register that can be read by the global V/F controller. After requesting a global performance state change, control then flows to block 404.

At block 404, it is determined whether local voltage control is enabled. If local voltage control is disabled, local performance state change requests are ignored. The local voltage control can be disabled for various reasons that can change between implementations. For example, some implementations may only allow a local performance state change if the voltage difference between the local performance state change and global performance state is greater than a certain amount. In other words, if the voltage difference is less than a certain amount, the local voltage controller is controlled by the global V/F controller. Furthermore, if certain components are restricted to only making performance change requests on a per-core basis, the functionality of those components can be turned off by disabling local voltage control. If it is determined that local voltage control is enabled, control then flows to block 406. If it is determined that local voltage control is disabled, control then flows to block 410.

At block 406, it is determined whether local voltage control should remain enabled. Local voltage control can be disabled if operating conditions change since the local voltage control was enabled. In other words, it is determined whether conditions are such that local voltage control should be disabled, such as those discussed above. If it is determined that local voltage control should remain enabled, control then flows to block 414. If it is determined that local voltage control should be disabled, control then flows to block 408.

At block 408, local voltage control is disabled. This can be accomplished in ways that vary between implementations. For example, if local voltage control functionality is implemented in software, a particular configuration variable can be set to a specific value. If the local voltage control functionality is implemented in hardware, a register bit can be set to 0 to signify the functionality is disabled. When local voltage control is disabled, the local voltage controller can be set to the global voltage. After disabling the local voltage control, the process ends.

Control flowed to block 410 from block 404 if it was determined that local voltage control is disabled. At block 410, it is determined whether local voltage control should be enabled. Local voltage control may be enabled based on changed operating conditions, such as the reasons discussed above regarding whether local voltage control should be disabled. If it is determined that local voltage control should be enabled, control flows to block 412. If it is determined that local voltage control should not be enabled, the process ends.

At block 412, local voltage control is enabled. The mechanism for enabling local voltage control can vary between implementations, and would be similar to the process for disabling local voltage control, as discussed above. Control then flows to block 414.

Control flowed to block 414 if it is determined at block 406 that local voltage control should remain enabled. Control also flowed to block 414 from block 412. At block 414, the local performance state is determined. This process is identical, or substantially similar, to the process depicted in FIG. 2. After the local performance state is determined, the core voltage is set in accordance with the determined performance state, and the process ends.

As discussed above, a transistor takes longer to switch states as the voltage applied to the transistor terminals decreases. If the voltage of a processor is too low for the processor frequency, errors can occur. The portions of the processor that begin to fail first in these scenarios are part of the "critical path." Computing system power management components can monitor the critical path to determine whether a given voltage is too low for a given frequency. For example, the power management components can determine that a particular portion of the critical path is not performing as expected. The power management component can then lower the frequency of the processor or increase the voltage applied to the processor until all portions of the critical path are performing as expected.

Errors in the critical path can manifest in the form of delays in the processor cycles, resulting in a lower effective frequency. Because performance state changes (and subsequently frequency/voltage levels) can occur rapidly, the performance management unit of a computing system may not be able to monitor the performance of all performance states. For example, assume a processor switches to a high performance state for short, but frequent periods. If the high performance state underperforms, a performance management unit may not notice if it checks at regular intervals that are significantly longer than the intervals spent in the high performance state. Similarly, taking an average of the amount of delay can mask the problem in the same scenario. Increasing the frequency with which the performance management unit monitors the critical path can add overhead to the computing system, potentially degrading performance.

A computing system can be designed such that the critical path can be monitored at intervals that are equivalent to the time between two performance state changes or a particular time period. Hardware can be added to track the difference between the expected cycle count and the actual cycle count of the current performance state, maintaining the maximum difference until read by the performance management unit. This allows the performance of the processor to be tracked at intervals small enough to capture each performance state change, while not adding significant overhead.

Figure 5:
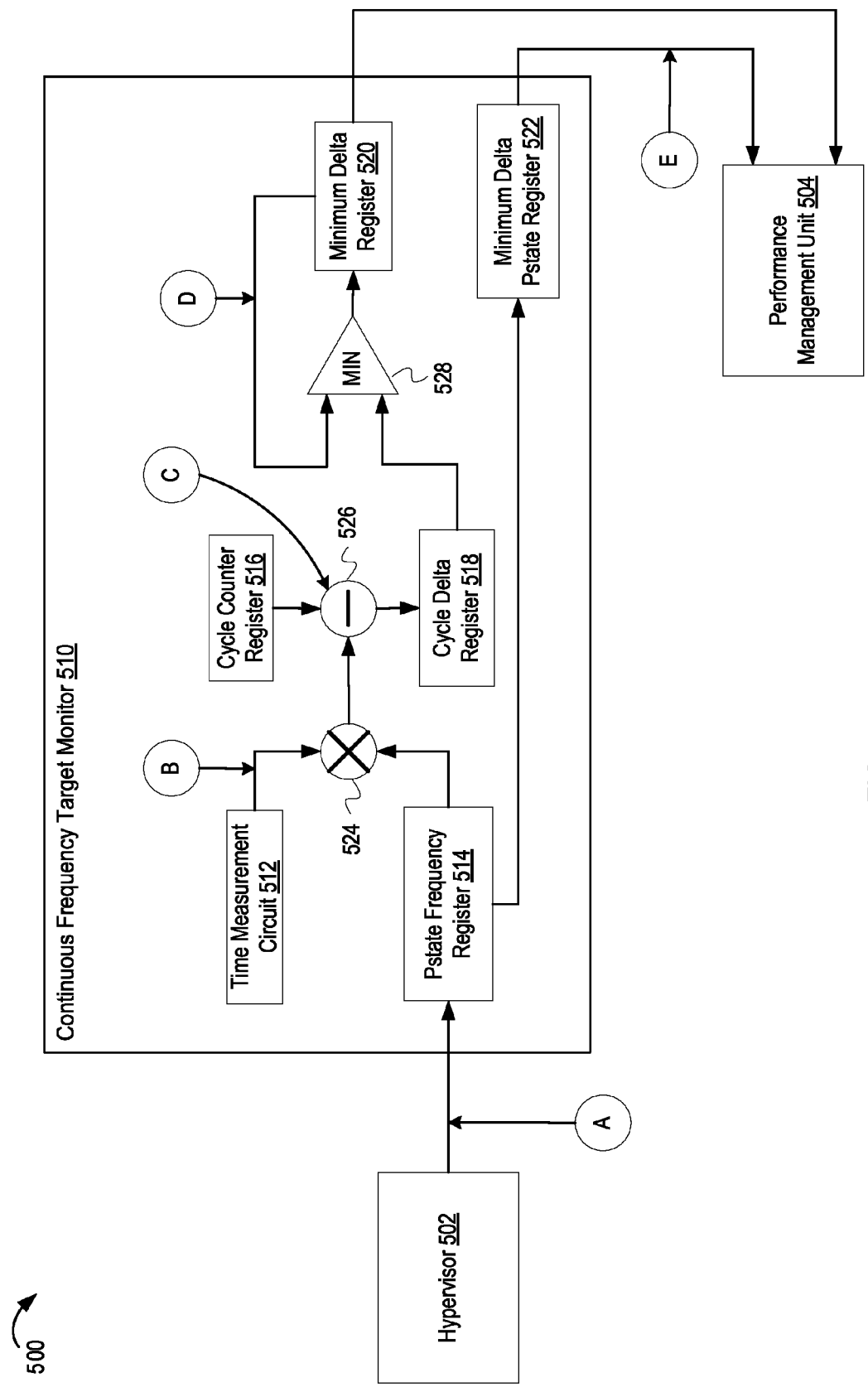
FIG. 5 depicts a hardware circuit designed to monitor the performance of a processor at small intervals.

FIG. 5 depicts a hardware circuit designed to monitor the performance of a processor at small intervals. FIG. 5 depicts a computing system 500, including a hypervisor 502, a frequency target monitor 510 and a performance management unit 504. The frequency target monitor 510 includes a time measurement circuit 512, a performance state register 514, a cycle counter register 516, a cycle delta register 518, a minimum delta register 520 and a minimum delta performance state frequency register 522. The frequency target monitor 510 also includes a multiplier 524, a subtractor 526 and a minimum selector 528.

At stage A, the hypervisor 502 requests a performance state change, and the frequency associated with the requested performance state is written to the performance state frequency register 514. When the performance state frequency register 514 is written to the time measurement circuit 512 and the cycle counter register 516 are reset to zero. The time measurement circuit 512 calculates the amount of time that has elapsed since the time measurement circuit 512 was last reset. The cycle counter register 516 receives an indication of a cycle from an oscillator, which can take the form of an electrical pulse. Each time the cycle counter register 516 receives an indication of a cycle, the value in the cycle counter register 516 is incremented.

At stage B, the current value in the time measurement circuit 512 is multiplied by the frequency of the current performance state, which is stored in the performance state frequency register 514. Stage B occurs in response to the performance state frequency being written to the performance state frequency register 514 in stage A. In other words, when a new value is written to the performance state frequency register 514, the current values in the performance state frequency register 514 and time measurement circuit 512 are multiplied before being reset. The value resulting from the multiplication of the performance state frequency and the elapsed time is the expected number of cycles. For example, if the frequency is three gigahertz and the elapsed time is one second, the expected number of cycles would be 3,000,000,000.

The multiplication can also be triggered if a certain amount of time has elapsed. For example, the time measurement circuit 512 may be configured to issue a time out every ten milliseconds. When the time measurement circuit 512 times out, it causes the same effects as if the performance state frequency register 514 were written to. Thus, the intervals are defined by the shorter of a specified time period and a performance state change. Adding the time out period allows for regular measurements to be taken even when the performance state stays the same for a long period of time. The specific time out interval can be configured statically in the time measurement circuit 512, or can be a modifiable value.

At stage C, the count of actual number of cycles is subtracted from the expected number of cycles. As discussed above, the cycle counter register 516 counts the number of cycles. Because the cycle counter register 516 is reset when the performance state changes or the time out occurs, the cycle counter register 516 allows for a comparison of the expected number of cycles calculated at stage B to the actual number of cycles over the same interval. The resulting value, the cycle delta, is stored in the cycle delta register 518. As with stage B, stage C is triggered by the writing of a value to the performance state frequency register 514 or a time out of the time measurement circuit 512. The cycle delta can be a signed value, allowing for the measurement of higher performance as well. Thus, the measurements can include situations in which performance is higher than expected, allowing for adjustment by lowering the voltage in similar situations.

At stage D, the current cycle delta value stored in the cycle delta register 518 is compared to the current minimum delta stored in the minimum delta register 520. The minimum selector 528 allows the minimum value between the current minimum delta and current cycle delta value pass through to be written to the minimum delta register 520. Thus, the minimum delta register 520 tracks the performance state with the lowest performance relative to the expected performance.

Because the cycle delta value is signed, the value is not necessarily the greatest cycle delta, but rather the most negative cycle delta. For example, a first performance state may have a cycle delta of fifty, while a second performance state may have a cycle delta of negative five cycles. Even though the first performance state had a greater absolute delta value, the second performance state had the minimum (most negative) delta value.

Additionally, if the current cycle delta value becomes the new minimum delta value, an indication of the performance state associated with the current cycle delta value is written to the minimum delta performance state register 522. This indication can be the actual performance state identifier or the frequency as stored in the performance state frequency register 514. If the value stored in the minimum delta performance state register 522 is the frequency associated with the performance state, the actual performance state can be determined by using the performance state table discussed above.

At stage E, the performance management unit 504 reads the values in the minimum delta register 520 and the minimum delta performance state register 522. The performance management unit 504 can then use the information to adjust the voltage for the given performance state frequency as appropriate. For example, if the minimum delta value is positive, signifying that the particular performance state overperformed, the performance management unit 504 can indicate that the processor should use a lower voltage for that performance state. By decreasing the voltage for the performance state, the performance management unit 504 provides the performance expected while reducing the amount of power used. If the minimum delta value is negative, signifying that the particular performance state underperformed, the performance management unit 504 can indicate that the processor should use a higher voltage for that performance state. By increasing the voltage for the performance state, the performance management unit 504 increases the amount of power used, but provides the expected performance. When the performance management unit 504 reads the values stored in the minimum delta register 520 and the minimum delta performance state register 522, the values are reset. When the values are reset, stage B and the subsequent stages can be triggered, replacing the read values with the current performance state and cycle delta.

Additionally, an extra bit, referred to as the "valid bit," can be associated with the minimum delta register 520 and the minimum delta performance state register 522. The valid bit is reset when the performance management unit 504 reads the values stored in the minimum delta register 520 and the minimum delta performance state register 522. When set, the valid bit indicates that the values in the minimum delta register 520 and the minimum delta performance state register 522 are valid. In some scenarios, such as when the frequency target monitor 510 compensates for frequency slewing, as discussed below, the values in the minimum delta register 520 and the minimum delta performance state register 522 may not be valid. Thus, in these scenarios, the performance management unit 504 can ignore the values read from the minimum delta register 520 and the minimum delta performance state register 522 until the valid bit is set to indicate that the values are valid.

In some embodiments, the frequency target monitor 510 includes a register that stores the aggregate cycle delta during the measurement interval. Unlike the minimum delta register 520, the aggregate cycle delta register is not reset between each interval. Instead, the current cycle delta stored in the cycle delta register 518 is added to the aggregate cycle delta register. The performance management unit 504 reads the value in the aggregate cycle delta register when it reads the values in the minimum delta register 520 and minimum delta performance state register 522. The aggregate cycle delta register is reset after being read by the performance management unit 504, like the minimum delta register 520 and minimum delta performance state register 522. The aggregate cycle delta register measures the total variation in performance over a set of intervals. This allows the performance management unit 504 to track the overall performance in addition to the worst performance. For example, if the processor underperforms over a period of time, the performance management unit 504 can increase the frequency of the processor to compensate for the previous loss of cycles. Although increasing the number of cycles at one point in time may not compensate for the loss of cycles at another point in time, it may still be better than no compensation at all.

In some embodiments, the current cycle delta and associated performance state can be written to a history table. In other words, instead of determining the minimum cycle delta and saving it to the minimum delta register 520, the values are written into a history table that contains an entry for a number of past performance states and their cycle delta values. The performance management unit 504 can then read the entire history table instead of reading the minimum delta register 520 and minimum delta performance state register 522. Thus, the performance management unit 504 has access to greater information which it can use to adjust performance state voltages. For example, in a scenario where all performance states are underperforming, reading a minimum delta register only provides information for the one performance state, delaying the correction of the other states. Keeping a history of more than one performance state cycle delta allows the performance management unit 504 to adjust multiple performance states at the same time.

Figure 6:
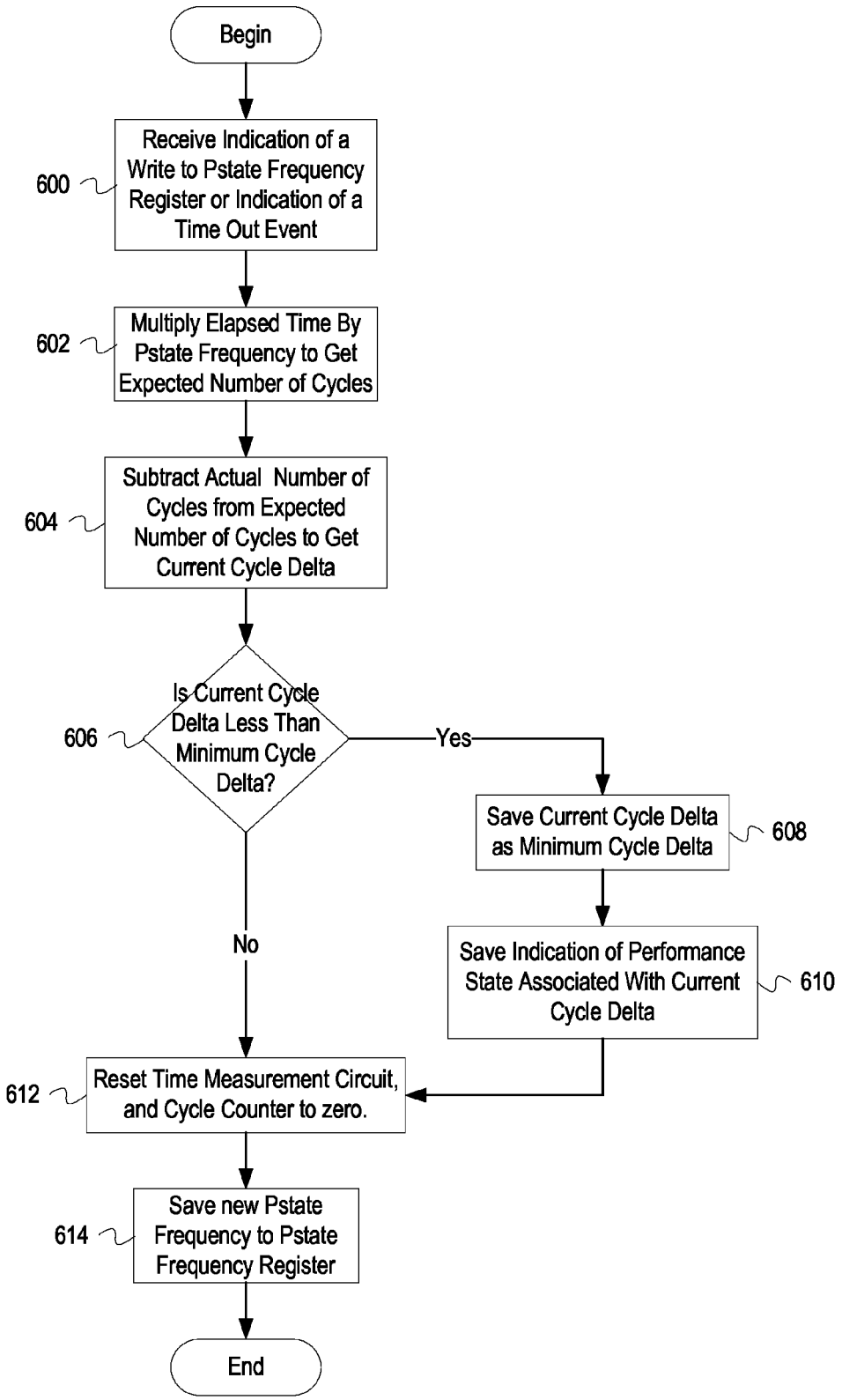
FIG. 6 depicts a flowchart of example operations for managing a core voltage controller.

FIG. 6 depicts a flowchart of example operations for managing a core voltage controller. Control is discussed in reference to a frequency target monitor 510 (FIG. 5).

At block 600, an indication of either a write to a performance state frequency register or a time out event is received. The indication of a write to the performance state frequency register indicates that a component is requesting a performance state change and that a measurement of the current performance be taken. An indication of a time out event indicates that a specified interval has elapsed and that a measurement of the current performance be taken. After receiving an indication of either a write to a performance state frequency register or a time out event, control then flows to block 602.

At block 602, the elapsed time is multiplied by the performance state frequency. The resulting value is the expected number of cycles over the given time interval. The performance state frequency is read from the performance state frequency register. The elapsed time is read from a register in a time measurement circuit. After calculating the expected number of cycles, control then flows to block 604.

At block 604, the actual number of cycles over the time interval is subtracted from the expected number of cycles calculated at block 602. This value constitutes the difference between the actual number of cycles and the expected number of cycles over the time interval, or the current cycle delta. The current cycle delta value is written to the cycle delta register. After calculating the current cycle delta, control then flows to block 606.

At block 606, it is determined whether the current cycle delta is less than the minimum cycle delta. The minimum cycle delta is stored in a minimum cycle delta register. To compare the current cycle delta with the minimum cycle delta, the current cycle delta is read from the current cycle delta register and the minimum cycle delta is read from the minimum cycle delta register. The two values are then compared using a circuit designed to select the minimum input as the circuit output. If the current cycle delta is less than the minimum cycle delta, it becomes the new minimum cycle delta, replacing the previous minimum cycle delta. If it is determined that the current cycle delta is less than the minimum cycle delta, control then flows to block 608. If it is determined that the current cycle delta is not less than the minimum cycle delta, control then flows to block 612.

At block 608, the current cycle delta is saved as the minimum cycle delta. The current cycle delta is written to the minimum cycle delta register, replacing the previous value. Thus, the current cycle delta becomes the new minimum cycle delta. Control then flows to block 610.

At block 610, an indication of the performance state associated with the minimum cycle delta is saved to the minimum delta performance state register. The indication of the performance state associated with the minimum cycle delta provides information for the computing system performance management unit. This information allows the performance management unit to determine how to adjust the voltage for the given performance state to achieve the desired performance. After saving the indication of the performance state associated with the minimum cycle delta, control then flows to block 612.

Control flowed to block 612 from block 606 if it was determined that the current cycle delta was not less than the minimum cycle delta. Control also flowed to block 612 from block 610. At block 612, a timer value used by the time measurement circuit and the cycle counter are reset to zero. This allows new measurements to be taken of the processor performance in response to a new performance state change or passage of a specified time interval. After the time measurement circuit and the cycle counter are reset to zero, control then flows to block 614.

At block 614, the new performance state frequency is saved to the performance state frequency register. The writing of the new performance state frequency triggered the measurement of the performance of the prior performance state. Once the measurement is completed, the new performance state frequency can be saved, replacing the prior performance state frequency. After the new performance state frequency is saved to the performance state frequency register, the process ends.

As example flowcharts, the flowcharts discussed herein present operations in an example order from which embodiments can deviate (e.g., operations can be performed in a different order than illustrated and/or in parallel).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java®, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
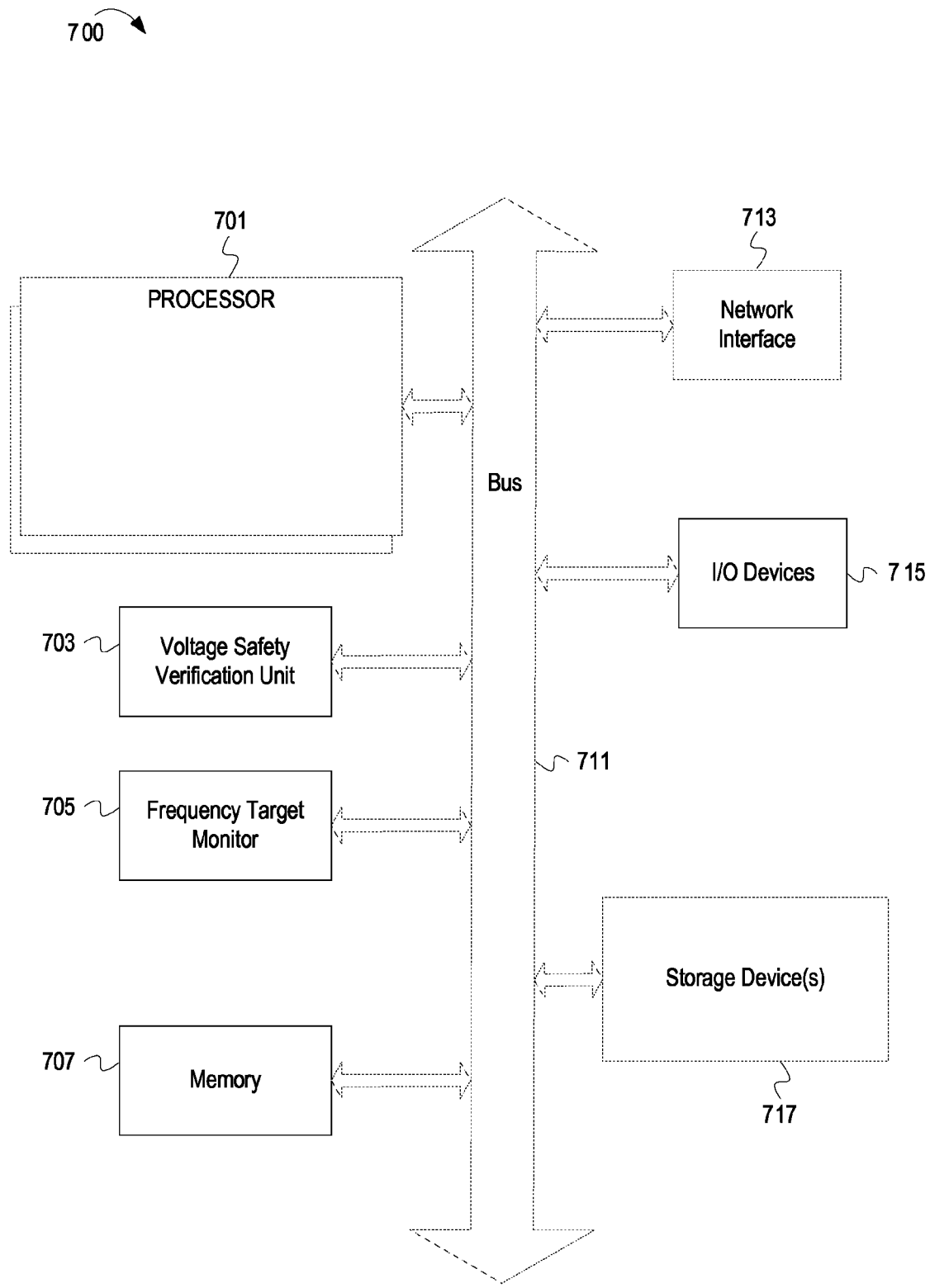
FIG. 7 depicts an example computer system with a voltage safety verification unit and a frequency target monitor.

FIG. 7 depicts an example computer system with a voltage safety verification unit and a frequency target monitor. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 711 (e.g., PCI, ISA, PCI-Express, HyperTransport®, InfiniBand®, NuBus, etc.), a network interface 713 (e.g., an ATM interface, an Ethernet interface, a Frame Relay interface, SONET interface, wireless interface, etc.), and a storage device(s) 717 (e.g., optical storage, magnetic storage, etc.). The computer system also includes one or more I/O devices 715. The computer system also includes a voltage safety verification unit 703 and a frequency target monitor 705. The voltage safety verification unit 703 and a frequency target monitor 705 embody functionality to implement embodiments described above. The voltage safety verification unit 703 embodies functionalities that facilitate the management of processor and processor core voltages. The frequency target monitor 705 embodies functionalities that facilitate the monitoring of the difference between the expected performance of a computing system component and the actual performance of the computing system component. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 711, and the network interface 713 are coupled to the bus 711. Although illustrated as being coupled to the bus 711, the memory 707 may be coupled to the processor unit 701.

While the embodiments are described with reference to various implementations and exploitations, it will be understood that these embodiments are illustrative and that the scope of the inventive subject matter is not limited to them. In general, techniques for computing system power management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    receiving, from a first component, an indication of a first frequency/voltage pair;
    setting an operating frequency of a second component equal to a frequency of the first frequency/voltage pair;
    receiving, from a third component, an indication of a voltage offset;
    determining a target voltage based, at least in part, on the voltage offset and the voltage of the first frequency/voltage pair, wherein the target voltage is different from the voltage of the first frequency/voltage pair;
    determining whether the target voltage is less than a minimum voltage;
    responsive to determining that the target voltage is less than the minimum voltage, setting an operating voltage of the second component equal to the minimum voltage without modifying the operating frequency of the second component; and
    responsive to a determination that the target voltage is not less than the minimum voltage, setting the operating voltage of the second component equal to the target voltage without modifying the operating frequency of the second component;
    wherein the first frequency/voltage pair is specified as a first performance state, wherein the voltage offset specifies a second performance state relative to the first performance state, and wherein the target voltage is a voltage associated with the second performance state.

2. The method of claim 1, further comprising:
    determining whether the target voltage is greater than a maximum voltage;
    responsive to determining that the target voltage is not greater than the maximum voltage, setting the operating voltage of the second component equal to the target voltage without modifying the operating frequency of the second component; and
    responsive to determining that the target voltage is greater than the maximum voltage, setting the operating voltage of the second component equal to the maximum voltage without modifying the operating frequency of the second component.

3. The method of claim 1, wherein the first component is one of a hypervisor, an operating system, an application, or a performance management unit.

4. The method of claim 1, further comprising sending an indication of the target voltage to the second component.

5. The method of claim 1, further comprising:
    determining whether voltage control should be enabled based, at least in part, on one or more operating conditions of the second component;

wherein said setting the operating voltage of the second component equal to the target voltage is responsive to determining that voltage control should be enabled.

6. The method of claim 1, wherein the second component is one of a processor, a processor core, or a computing system device.

* * * * *